(12) United States Patent
Runarvot et al.

(10) Patent No.: US 8,347,914 B2
(45) Date of Patent: Jan. 8, 2013

(54) SYSTEM FOR FILLING A TANK

(75) Inventors: Hervé Runarvot, Entrammes (FR);
Patrick Ganachaud, Laval (FR);
Mickaël Charrier, Montjean (FR)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 673 days.

(21) Appl. No.: 12/374,803

(22) PCT Filed: Jul. 31, 2007

(86) PCT No.: PCT/EP2007/057866
§ 371 (c)(1),
(2), (4) Date: Nov. 5, 2009

(87) PCT Pub. No.: WO2008/015205
PCT Pub. Date: Feb. 7, 2008

(65) Prior Publication Data
US 2010/0147404 A1 Jun. 17, 2010

(30) Foreign Application Priority Data
Jul. 31, 2006 (FR) ...................... 06 07001

(51) Int. Cl.
*F16K 24/00* (2006.01)

(52) U.S. Cl. .................. 137/588; 141/350; 220/86.2

(58) Field of Classification Search .................. 137/587, 137/588, 614.2, 614.11, 614.19; 141/350; 220/86.2; 251/235, 338, 243
See application file for complete search history.

(56) References Cited

U.S. PATENT DOCUMENTS
5,322,100 A 6/1994 Buechler et al.
6,009,920 A * 1/2000 Palvoelgyi et al. ........... 141/348
6,446,685 B2 * 9/2002 Stiegler et al. ................ 141/301
6,691,750 B1 * 2/2004 Foltz ............................. 141/350
(Continued)

FOREIGN PATENT DOCUMENTS
FR 2861655 A1 5/2005
(Continued)

OTHER PUBLICATIONS
PCT International Search Report dated Jan. 22, 2008 for International Application No. PCT/EP2007/057866 (3 pp.).
(Continued)

*Primary Examiner* — Craig Schneider
*Assistant Examiner* — Ian Paquette
(74) *Attorney, Agent, or Firm* — Oblon, Spivak, McClelland, Maier & Neustadt, L.L.P.

(57) ABSTRACT

System for filling a tank comprising a pipe head and a fill pipe extending between the pipe head and the tank. The pipe head comprises a chamber with an inlet opening that connects to the atmosphere and an outlet opening that connects to the fill pipe and a stopper being movable between open and closed positions to open or close the access to the fill pipe, the head inlet and outlet openings being sized and arranged to allow introduction of a filling nozzle into the fill pipe through the pipe head when the stopper is in its open position. The fill pipe comprises or is preceded by a local restriction designed so that the cross section of the passage for the nozzle is substantially reduced to the outer diameter of the nozzle. A degassing connection links the fill pipe and the pipe head outside of its outlet opening.

16 Claims, 4 Drawing Sheets

U.S. PATENT DOCUMENTS

| | | |
|---|---|---|
| 6,945,290 B1 * | 9/2005 | Benjey et al. ................. 141/302 |
| 6,983,773 B1 * | 1/2006 | Hagano et al. ................. 141/350 |
| 2004/0144443 A1 | 7/2004 | Ganachaud |
| 2005/0205160 A1 | 9/2005 | Ganachaud et al. |
| 2007/0074785 A1 | 4/2007 | Ganachaud |
| 2007/0261742 A1 | 11/2007 | Pozgainer |

FOREIGN PATENT DOCUMENTS

| | | |
|---|---|---|
| WO | WO 02072377 A2 | 9/2002 |
| WO | WO 2004024488 A1 | 3/2004 |
| WO | WO 2006066294 A1 | 6/2006 |

OTHER PUBLICATIONS

Search Report dated Jun. 19, 2007 from Institut National de la Propriete Industrielle for French Application No. FR06.07001 (2 pp.).

* cited by examiner

US 8,347,914 B2

SYSTEM FOR FILLING A TANK

BACKGROUND OF THE INVENTION

1. Field of the Invention

The present invention relates to a system for filling a tank, in particular a fuel tank.

The fill pipes present in fuel tanks, in particular the tanks aboard motor vehicles, are sealed during normal use of the tank, outside the filling periods. Sealing is generally performed by means of a cap that is introduced into the upper part of the pipe while transmitting a rotational movement thereto in order to close the pipe in a liquid-tight and gas-tight manner.

2. Description of the Related Art

The operations of removing the cap before filling the tank, of replacing this cap and of closing the pipe after filling are most of the time carried out manually by the user. When the tank filling is finished, it may sometimes be forgotten to replace the cap and this then gives rise to the loss of this cap and to the pipe remaining open to the atmosphere for an indeterminate time. During this period, loss of liqud fuel occurs and vapours escape into the atmosphere.

For the purpose of preventing loss of the cap and contamination of the atmosphere which results therefrom, sealing systems integrated to the fill pipe, often called "capless" systems, have been proposed, replacing the traditional cap. Thus, for example, Application FR 2 861 655 in the name of the Applicant describes a pipe system with a chamber, arranged in which is a stopper that can be moved between an open position, in which the opening of the passage is aligned with the inlet and outlet openings of the chamber, and a closed position, in which the outlet opening is sealed. Such a pipe system has the advantage that the stopper is integrated into the pipe head and cannot be lost or forgotten. Moreover, an automatic opening and closing of the pipe head by introduction and withdrawal of a filling nozzle enables the task of the user to be made easier.

Furthermore, with a view to preventing the release of gases and liquids to the atmosphere while filling the tank, systems with a mechanical seal have been developed: see, for example, Application WO 02/072377 in the name of the Applicant. Although very effective, these systems generally involve a cost premium (linked in particular to the relatively complicated geometry of the seal) and will only be truly commercialized when they are imposed by legislation relating to the environment. The systems marketed currently indeed do not generally comprise such a seal and the fuel vapours generated during filling are either completely discharged to the environment, or partly recirculated in the fill head.

One drawback of such systems (without a mechanical seal) is however the possibility of discharge of liquid fuel during the filling phase, in particular at the end of the filling phase. Specifically, the pressure increase in the fill pipe during the filling phase may cause a discharge of liquid fuel in the direction of the user. The discharged fuel may be projected in the direction of the user especially because the head and fill pipe generally have a cross section larger than the diameter of the nozzle, which therefore allows the liquid to be discharged. This phenomenon, often called "spit-back" must of course be prevented to protect the user and the environment.

BRIEF SUMMARY OF THE INVENTION

The object of the present invention is to provide a system for filling a tank, in particular a fuel tank, with which the projection of liquid at the end of filling may be prevented and this without recourse to a mechanical seal.

For this purpose, the invention relates to a system for filling a tank comprising a head and a fill pipe extending between the head and the tank, in which:

the pipe head comprises a chamber with an inlet opening that connects to the atmosphere and an outlet opening that connects to the fill pipe and a stopper to close the access to the fill pipe, the stopper being movable between an open position, in which the access to the fill pipe is open, and a closed position, in which the access to the fill pipe is closed, the inlet and outlet openings of the head being sized and arranged so as to allow introduction of a filling nozzle into the fill pipe through the pipe head when the stopper is in its open position;

the fill pipe comprises or is preceded by a local restriction designed so that the cross section of the passage for the nozzle is substantially reduced to the outer diameter of the nozzle; and a degassing connection links the fill pipe and the fill head outside of the outlet opening of the latter head.

The present invention may be applied to any type of tank intended to be filled using an "automatic" filling nozzle (that stops automatically at the end of filling). It gives good results with fuel tanks The expression "fuel tank" is understood to mean a leakproof tank, able to store fuel under diverse and varied usage and environmental conditions. An example of this tank is that with which motor vehicles are fitted.

The fuel tank is preferably made of plastic.

The term "plastic" means any material comprising at least one synthetic polymer resin.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10 degrees Celsius are particularly well suited. Examples of such materials are those that exhibit polydispersity of their molecular weight.

In particular, it is possible to use polyolefins, thermoplastic polyesters, polyketones, polyamides and copolymers thereof. A blend of polymers or copolymers may also be used, similarly it is also possible to use a blend of polymeric materials with inorganic, organic and/or natural fillers such as, for example but non-limitingly: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel. The tank according to the invention preferably comprises an EVOH-based barrier layer located between the HDPE-based outer layers.

The filling system according to the invention comprises a fill pipe and a pipe head preferably comprising a nozzle guide. It also comprises a restriction of local cross section (i.e. extending preferably over a length of a few mm only) just after the head outlet (preceding or being integrated into the fill pipe) and also a connection between the head and the fill pipe to provide degassing when filling. By definition, this connection is an open conduit, opened as soon as filling takes place, and this regardless of the pressure in the tank. According to the invention, this conduit is outside the outlet opening of the fill head so that it is completely open (not obstructed) even when a filling nozzle is inserted into the system according to the invention.

The restriction of local cross section at/before the fill pipe may be produced in any known manner. In particular, it may be produced by an appropriate geometry of the pipe itself, or by recourse to a separate part. Preferably, it is formed by a separate part, preferably attached between the fill pipe and the fill head.

According to a first variant, this separate part is an intermediate part made of a rigid thermoplastic attached by welding between the head and the fill pipe. The cross section of the local restriction is then preferably slightly larger than the outer diameter of the filling nozzle. The space between the local restriction and the filling nozzle is therefore reduced to a minimum, thus preventing a discharge of fuel through this space. In practice, the diameter of this cross section will be a few tenths of a mm larger than the maximum outer diameter of the nozzle (which is standardized depending on the type of fuel). In general, it will be at least two, or even three, tenths of a mm greater than this diameter. The difference between the two diameters will advantageously not however exceed 1 mm, or even 0.5 mm.

Alternatively, the separate part is made of a flexible material, but preferably of simple geometry (in order not to fall into the cost premium problems mentioned previously). The cross section of the local restriction is then preferably slightly smaller than the outer diameter of a filling nozzle (the difference between the diameters generally being at least 0.2 mm, even at least 0.3 mm, but preferably at most 1 mm, or even at most 0.5 mm). The component made of a flexible material may be attached as is between the head and the pipe. Preferably, it is attached to or overmoulded on an intermediate part made of a rigid thermoplastic which is used to support it and which is attached (welded) between the head and the pipe. The flexible part marries with the shape of the filling nozzle and completely closes off the escape route of liquid fuel between the fill pipe and the filling nozzle. Preferably however, this closure is not entirely leakproof and contributes to the discharge of gases when there is an overpressure.

For this same reason, and also for its ease of production, the cross section restriction is preferably formed by a rigid intermediate part welded between the head and the pipe, and its cross section is slightly larger than the diameter of the filling nozzle.

The aforementioned intermediate part which bears (directly or indirectly) the cross section restriction is preferably also produced from a thermoplastic and it is preferably obtained by injection-moulding. Given that it is preferably welded between the head and the pipe, it is therefore preferably based on a material that is compatible with the head and pipe. This is preferably a polyacetal and, in particular, POM (polyoxymethylene) and this with a view to better meet the emission standards (for example, LEV II in the United States). It may also be a polyamide or HDPE that may or may not comprise a barrier layer and/or be surface-treated (see above).

Preferably, the intermediate part comprises a pipe extending at least partly inside the fill pipe and having a diameter smaller than that of said pipe. The length of this pipe section is generally at least 10 mm, even 20 mm and preferably at least 50 mm. It generally does not however exceed 100 or even 80 mm. More particularly preferably, it comprises a funnel (frustoconical) part which is used to guide the nozzle. The local restriction is advantageously positioned in the funnel section. Preferably, the local restriction consists of the end of the funnel section (as in the figures appended to the present document).

According to one preferred variant of the invention, the intermediate part delimits an intermediate chamber between the pipe head and the fill pipe, the intermediate chamber having a larger cross section than that of the filling nozzle and being divided into an upstream part directed towards the pipe head (and connecting with it via its outlet orifice) and a downstream part directed towards the fill pipe. Therefore, for the purpose of producing the degassing connection between the pipe and the head, this intermediate chamber is preferably equipped with two orifices: one (a lower one) connecting it with the fill pipe, and one (an upper one) connecting it with pipe head, and being located outside of the outlet orifice of the pipe head (i.e. being a separate orifice from this outlet orifice). This variant is preferred since the intermediate chamber may then act as a liquid/vapour separator and, by doing so, further limit the risk of projections towards the user.

According to one particularly preferred variant of the invention, the fill pipe or the intermediate part is equipped with a vapour recirculation duct linked to the tank, or with a coupling to such a duct. This variant makes it possible to have a sufficient gas flow in order to avoid premature shut off and overfilling of the tank. More particularly preferably, this is a coupling that emerges into the intermediate part via an orifice called a recirculation orifice. When the part comprises an intermediate chamber, this orifice is preferably located below said chamber. More particularly preferably, the lower orifice of the intermediate chamber and the recirculation orifice are positioned on both sides (in a diametrically opposed manner) of the cross section restriction. Thus, a "baffle" (deflector) effect is obtained.

For this same reason, the lower and upper orifices of the intermediate chamber are preferably positioned at a certain distance from each other, preferably also in a diametrically opposed manner. According to one particularly advantageous variant, these orifices make it possible to create a preferential escape route so that the discharged fuel preferably passes via it and not via the outlet opening of the fill head.

The system according to this variant of the invention preferably comprises, in addition, a mobile component that can be moved between a first position, in which the upper opening of the intermediate chamber is sealed, and a second position, in which this opening is open, and an activation means for moving the mobile component into its second position when the stopper is moved into its open position. Such a mobile component makes it possible to close the connection between the intermediate chamber and the chamber of the pipe head in normal use, that is to say outside of the tank-filling periods.

It should be noted that the use of such a degassing opening (located outside of the passage section of the head provided for the nozzle) and of the mobile component is advantageous and this regardless of the structure of the fill-pipe system downstream of the pipe head (i.e. also outside the scope of the present invention). Thus, it can be envisaged to use a pipe head comprising such a degassing connection and such a mobile component independently of the presence of a cross section restriction and/or an intermediate chamber as described above.

Preferably, the pipe head comprises, in addition, a prestressing means for keeping the mobile component in its first position, the mobile component and the stopper being formed and arranged so that the movement of the stopper into its open position causes the movement of the mobile component into its second position. When the mobile component is in its first position, the upper orifice of the chamber is sealed and the connection between the pipe head and the intermediate chamber is broken. Due to the interaction between the stopper and the mobile component, this orifice is only open when the stopper is in its open position, that is to say during a filling phase. In general, the intermediate chamber is therefore isolated from the fill pipe, thus preventing leaks of fuel in the liquid or gaseous state.

Although the use of a prestressing means is preferred, it is not excluded to make use of gravitational force to keep the mobile component in its first position when the stopper is not in its open position.

The mobile component may comprise an oblong body with a first end and a second end, the first end comprising a means for engaging with the stopper and the second end being designed to seal the upper orifice of the chamber when the mobile component is in its first position. The engagement means of the mobile component may comprise a nose that cooperates with a bearing of the stopper. With such an engagement means, the movement of the mobile component into its second position, and therefore the opening of the orifice, may easily be achieved by movement of the stopper into its open position.

Alternatively, the mobile component may comprise a part in the form of a rocker arm that integrates (either in one piece, or by attachment) a part acting as a spring at one end and a counterweight at the other end, and comprising at least one excrescence of which the shape, size and location are suitable so that it can seal the upper opening of the chamber in a given position of the rocker arm and unblock this orifice in another position of the rocker arm. In this variant, it is sufficient to equip the stopper with an excrescence capable of acting on the rocker arm to make it swing from one position to the other. It should be noted that the term "excrescence" does not necessarily mean a piece formed (where appropriate, moulded) from one part with the rocker arm.

Preferably, the pipe head comprises, in addition, a discharge opening, the mobile component being designed so as to keep the discharge opening open when the mobile component is in its first position and to seal the discharge opening when the mobile component is in its second position. When the mobile component is in its first position, the discharge opening is open, thus allowing, for example, discharge of water from the chamber of the pipe head. Indeed, the water which may accumulate in the chamber may thus be discharged to a collection tank or to the atmosphere. The penetration of water into the fill pipe or into the fuel tank through the outlet opening of the head or upper orifice of the chamber when the stopper is in its open position may thus be avoided. On the other hand, when the mobile component is in its second position, the discharge opening is closed, thus making it possible to prevent the discharged fuel from escaping to the collection tank or to the atmosphere.

In the variant according to which the mobile component is a rocker arm, a simple way of producing this in practice consists in putting the counterweight on the right of the discharge opening so that, in the rest position of the rocker arm corresponding to the open position of the stopper, the counterweight (or a part—seal—attached to it) seals this opening and that, when the stopper is in its closed position, an excrescence attached to this pushes on the spring part of the rocker arm so as to raise the counterweight and unblock the discharge opening.

The various orifices (openings) named below generally have sizes of the order of mm; in particular (D=diameter):

D (recirculation orifice)=8-12 mm≧D (lower orifice of the chamber)=8-10 mm≧D (upper orifice of the chamber)=6-8 mm≧D (water-discharge orifice)=1-2 mm. It should be noted that each of these approximate and comparative values are valid independently of one another.

As described in the aforementioned Application FR 2 861 655, the stopper is preferably a rotating valve body with an opening of cylindrical passage passing through the valve body and an outer wall sealing the outlet opening of the chamber when the stopper is in its closed position. Such a valve body makes it possible, depending on its position, to be used either as a stopper for sealing the outlet opening, or as a passage between the inlet opening and the outlet opening. Such a valve body may be swung between the closed and open positions without obstruction. Indeed, the rotating valve body is rotated on itself so that the end of the passage opening is aligned with the outlet opening when the stopper is in its open position. In its closed position, the end of the passage opening is not aligned with the outlet opening so that the latter is sealed by the outer wall of the valve body. The cylindrical passage opening in the valve body may have a cross section substantially corresponding to the cross section of a filling nozzle head. The space between the cylindrical passage and the filling nozzle head is thus reduced to a minimum, largely preventing discharge of fuel through the passage opening and favouring discharge of fuel through the third degassing connection.

The valve body may be housed on a seat, the outlet opening of the chamber being cut into the seat.

The pipe system preferably comprises, in addition, a sealing flap linked to the inlet opening, the sealing flap being able to be moved between an open position and a closed position of the inlet opening. A coupling member connects the sealing flap to the stopper, so that the stopper is moved into its open position when the sealing flap is moved into its open position, and so that the stopper is moved into its closed position when the sealing flap is moved into its closed position. In its closed position, the sealing flap protects the chamber of the pipe head from infiltration of foreign bodies coming from the atmosphere. The sealing flap is preferably kept in its closed position by a prestressing means and is swung into its open position under the action of introducing a filling nozzle into the chamber. Due to the coupling member, swinging of the sealing flap causes swinging of the stopper. The stopper is automatically swung into its open position when a filling nozzle is introduced into the pipe head. It is consequently not necessary to provide a separate actuator for swinging the stopper.

More particularly preferably, the system according to the invention is equipped with a locking system. Preferably, this comprises a flap that can be rotated about an axis that is substantially perpendicular to that of the pipe head, this rotation being caused by an actuator comprising a feed screw; an electric motor capable of rotating the screw both to the right and to the left; and a wheel (section), equipped with gears that are complementary to the pitch of the screw, positioned perpendicular to and in contact with this screw and being integrated or attached to one end of the locking flap. Such a system is the subject of Application FR 0609756 in the name of the Applicant, of which the content is, for this purpose, incorporated by reference in the present application.

BRIEF DESCRIPTION OF THE DRAWINGS

Other particularities and features of the invention will appear from the description of an advantageous embodiment given below, by way of illustration, with reference to the appended drawings which show.

DETAILED DESCRIPTION OF THE INVENTION

Figure 1:
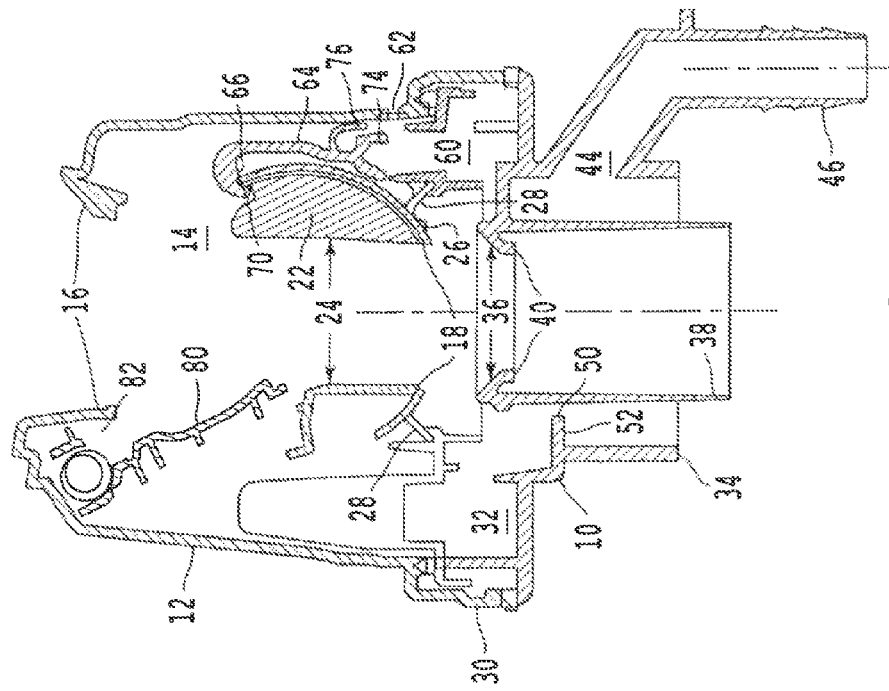
FIG. 1: a schematic cross section through one part of a fill pipe system according to one variant of the invention, with the stopper in its closed position.
Figure 2:
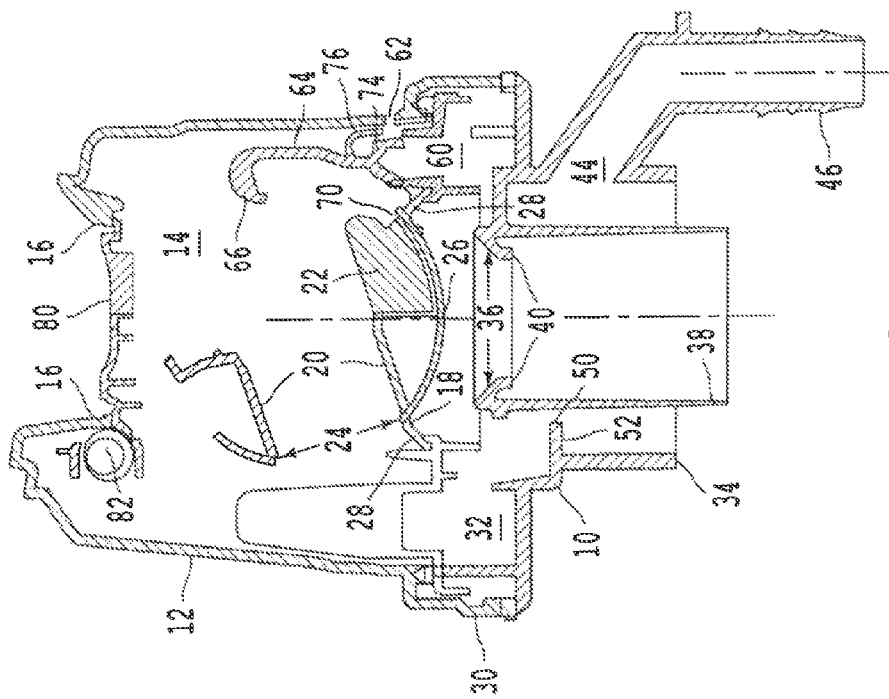
FIG. 2: a schematic cross section through the part of the pipe system from FIG. 1, with the stopper in its open position.

A fuel system for a motor vehicle generally comprises a fuel tank and a fill pipe enabling the fuel tank to be filled. FIGS. 1 and 2 in fact illustrate an intermediate part (10) intended to be attached (by welding its wall (34)) to such a fill pipe and comprising a first section in the form of a guide (38) for a flow of fuel during filling, intended to be inserted into the fill pipe, a second pipe section (46) intended to be connected to a recirculation duct and an intermediate chamber (32), connected to a pipe head (12) intended to receive the head of a filling nozzle (not shown). The pipe head (12) comprises a chamber (14) with an inlet opening (16) that connects with the atmosphere and an outlet opening (18) that connects with the intermediate chamber (32). A stopper (20) is positioned between the inlet opening (16) and the outlet opening (18) so as to prevent or allow the introduction of a head of a filling nozzle into the fill pipe through the pipe head (12).

The stopper (20) comprises a rotating valve body (22) with a cylindrical passage opening (24) and an outer wall (26). The valve body (22) is housed on a seat (28) in which the outlet opening (18) is formed. The valve body (22) can be moved between a closed position (illustrated in FIG. 1) and an open position (illustrated in FIG. 2).

In the closed position, the passage opening (24) is not aligned with the outlet opening (18), the latter being sealed by the outer wall (26) of the valve body (22). In this position, the introduction of a filling nozzle is prevented and also any exchange of fluid between the chamber (14) of the pipe head (12) and the fill pipe is prevented.

In the open position, the passage opening (24) is aligned with the inlet (16) and outlet (18) openings, thus allowing a filling nozzle to be introduced into the fill pipe.

The system illustrated comprises a flare (30) in the bottom of the pipe head (12) that enables the intermediate part (10) to be attached by welding. This intermediate part comprises an upstream section delimiting the chamber (32) and being directed towards the pipe head (12); a downstream section comprising a wall (34) intended to be welded to the fill pipe and equipped with a coupling (46) to the recirculation duct; and a funnel component (36) leading to the guide (38) of which the lower section is intended to be inserted into the fill pipe. The funnel component (36) terminates in a local cross-sectional restriction (40) having a flow area that substantially corresponds to the diameter of a filling nozzle.

The coupling (46) leads into the part via a recirculation orifice (44). During filling, the vapours from the tank (and that result from the volume of gas displaced by the liquid) are at least partly recirculated via this orifice.

The intermediate part (10) also comprises a lower orifice (50) positioned between a substantially horizontal wall (52) and the pipe section (38). The orifices (44, 50) are arranged so as to create a baffle for the discharged fuel and to thus prevent a direct discharge to the outside of the pipe-filling system.

The intermediate part (10) also comprises an upper orifice (60) connecting the intermediate chamber (32) and the chamber (14) of the pipe head (12). The latter comprises an opening (62) for discharging water between the chamber (14) and a collection tank (not shown) or the atmosphere. A mobile component (64) is positioned in the chamber (14) and can be moved between a first position and a second position so as to, each time, seal either the upper orifice (60) or the water-discharge opening (62).

In its first position—shown in FIG. 1—the mobile component (64) seals the orifice (60) and keeps the discharge opening (62) open. A discharge of fuel from the fill pipe to the chamber (14) through the orifice (60) is thus prevented. On the other hand, the discharge of water possibly present in the chamber (14) is made possible through the discharge opening (62) which makes it possible to prevent the water from penetrating into the fill pipe, and consequently the fuel tank, during the filling phase.

In its second position—shown in FIG. 2—the mobile component (64) seals the discharge opening (62) and keeps the orifice (60) open. A discharge of fuel from the fill pipe to the chamber (14) through the orifice (60) is thus made possible. This is however mainly gaseous fuel, the liquid having been largely retained by the intermediate part (10) and its baffles. The geometry of the chamber (14) is, in addition, such that it receives the discharged fuel and prevents projection of the fuel in the direction of the user through the outlet opening (18). On the other hand, in this position, the water-discharge opening (62) is sealed, thus preventing the release of the discharged fuel into the collection tank or into the atmosphere.

It should be noted that in this position, during filling, the flow of fuel supplying the tank creates a suction effect as little gas escapes through the opening (50) and most is recirculated (sucked through the opening (44)). It is only at the end of the filling, when the liquid rises in the pipe and makes the nozzle switch off, that the gases and liquid can escape through this opening. It is there that the illustrated device according to the invention is involved, which device allows:

1—a liquid/vapour separation, which makes it possible to "cushion" the end of the filling and enables the nozzle to stop without overflowing;

2—a separation between the degassing that comes from the tank and that from inside the pipe, which is discharged during filling, thereby preventing turbulence during filling; and 3—a restriction around the spout of the nozzle, preventing liquid from rising around the latter at the end of filling.

The activation means of the mobile component (64) is formed, according to the embodiment illustrated in FIGS. 1 and 2, by a nose (66) on a first end of the mobile component (64) and by a bearing (70) on the valve body (22). The nose (66) and the bearing (70) are arranged so that, during movement of the valve body (22) to its open position, the bearing

(70) comes into contact with the nose (66), thus positioning the mobile component (64) in its second position. During movement of the valve body (22) to its closed position, the bearing (70) is disengaged from the nose (66), and the mobile component (64) is moved into its first position, preferably under the action of a prestressing means, such as a spring (not shown).

A second end of the mobile component (64) comprises a component in the shape of a bell (74) enabling the orifice (60) to be sealed when the mobile component (64) is in its first position and a tongue (76) enabling the discharge opening (62) to be sealed when the mobile component (64) is in its second position. The bell component (74) also makes it possible to break the flow of discharged fuel passing through the orifice (60) and to favour a lateral distribution of the fuel.

The pipe head (12) illustrated comprises, in addition, a sealing flap (80) linked to the inlet opening (16) and which is raised by swinging about a rotation axis (82) enabling it to be moved between an open position and a closed position of the inlet opening (16). The sealing flap (80) is preferably prestressed in its closed position and is swung into its open position by introducing a filling nozzle into the chamber (14) through the inlet opening (16).

The sealing flap (80) is advantageously connected to the stopper (20) by a coupling member (not shown in these figures) so that the stopper (20) is moved into its open position when the sealing flap (80) is moved into its open position, and so that the stopper (20) is moved into its closed position when the sealing flap (80) is moved into its closed position.

Figure 3B:
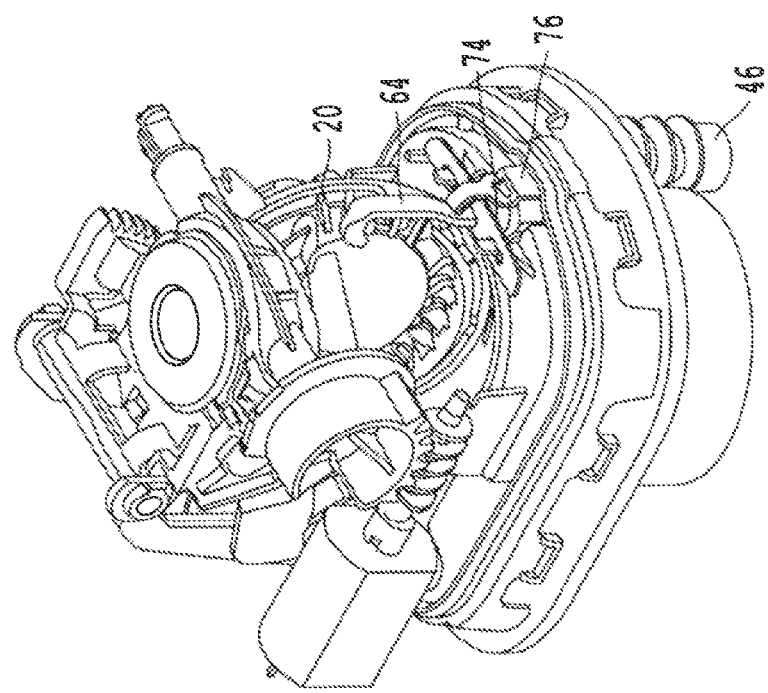
FIG. 3: a three-dimensional view of a system corresponding to the principle illustrated in FIGS. 1 and 2 respectively in the open and closed position.
Figure 3A:
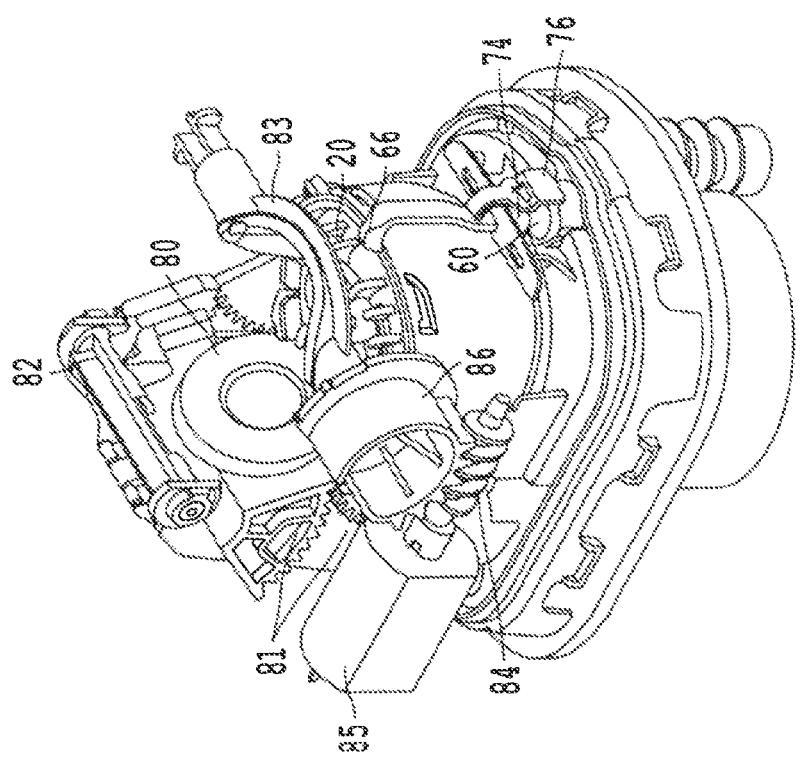

FIG. 3 illustrates a system that corresponds to the principle shown schematically in FIGS. 1 and 2, but where the head itself (12) has been removed in order to show the underlying components. This system integrates a locking flap (83) that can be rotated about an axis that is substantially perpendicular to that of the pipe head, this rotation being caused by an actuator comprising a feed screw (84); an electric motor (85) capable of rotating the screw both to the right and to the left; and a wheel (section) equipped with gears (86) that are complementary to the pitch of the screw (84), positioned perpendicular to and in contact with this screw and being integrated or attached to one end of the locking flap (83).

In the open position of the system illustrated on the left, the locking flap (83) is in a position so that it has enabled the main flap (80) to swing about its axis (82) and by doing this, to move the stopper (20) via a system of corresponding pinions (81). In turn, by swinging into its open position, the stopper (20) has raised the mobile component (64), hooking it up by its nose (66). Therefore, the fuel drainage orifice (60) is open, unblocked by the bell (74), while the tongue (76) seals the water-discharge opening (62) present in the head (not shown in this figure).

In the closed position of the system illustrated on the right, the locking flap (83) blocks the swinging of the main flap (80) and, by doing so, leaves the stopper (20) in its closed position and the mobile component (64) in its rest position where, by gravity, the bell (74) seals the fuel drainage orifice and where the tongue (76) unblocks the water-discharge opening in the head (not shown).

Figure 4:
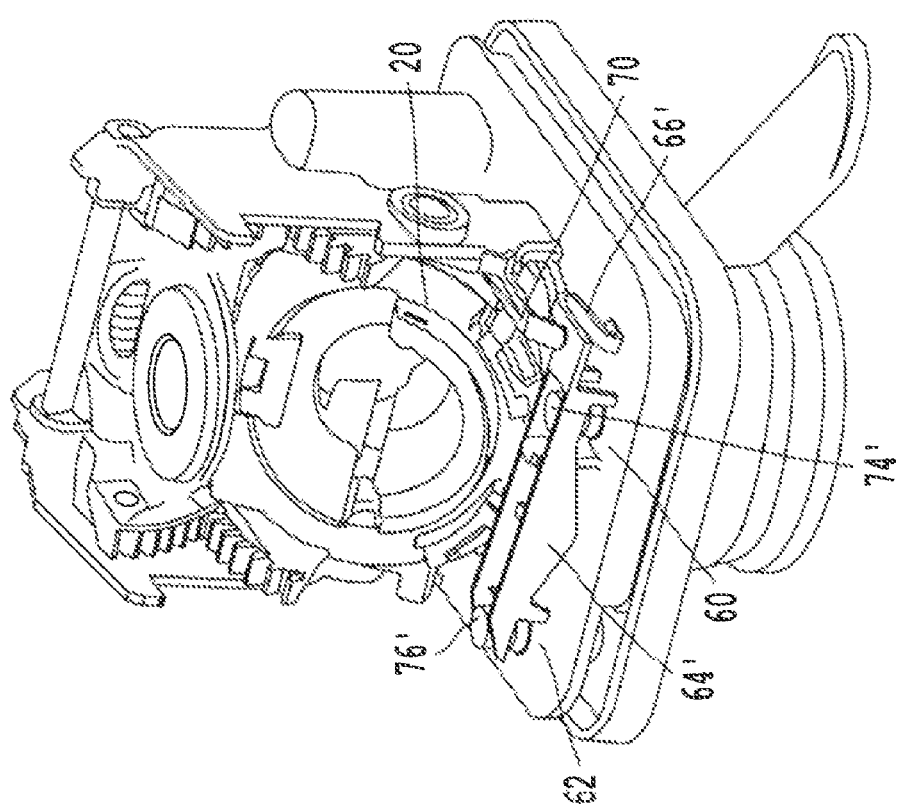
FIG. 4: a three-dimensional view of a system according to another variant of the invention in the closed position.

FIG. 4 illustrates a similar system but where the mobile component this time is in the form of a rocker arm (64') having an S-shaped part (66') which acts as a spring and acting on which part is a tongue (70') attached to the stopper (20), a counterweight (76') capable of sealing/unblocking the water-discharge opening (62) and an excrescence (74') capable of sealing/unblocking the fuel drainage orifice (60).

In the closed position of the system (which is the one represented in this figure), the tongue (70') compresses the S-shaped part (66') of the rocker arm (64') so that the counterweight (76') is raised and unblocks the water-discharge opening (62). In this position, the excrescence (74') seals the fuel drainage orifice (60).

During the opening of this system, the stopper (20) swings upwards and, by doing so, the tongue (70') unblocks the S-shaped part (66') which is moved upwards by the counterweight (76'). Therefore, the counterweight (76') seals, by gravity, the water-discharge opening (62) while the excrescence (74'), which is moved upwards by the S-shaped part (66'), unblocks the fuel drainage orifice (60). Such a system is more robust than that of the previous figure.

Figure 5B:
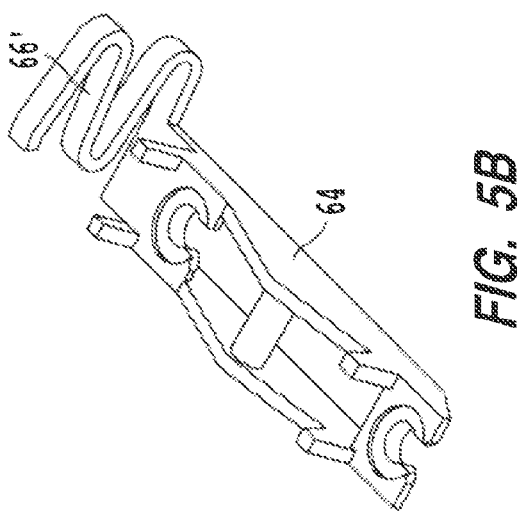
FIG. 5: an enlargement of one part of the system illustrated in FIG. 4.
Figure 5A:
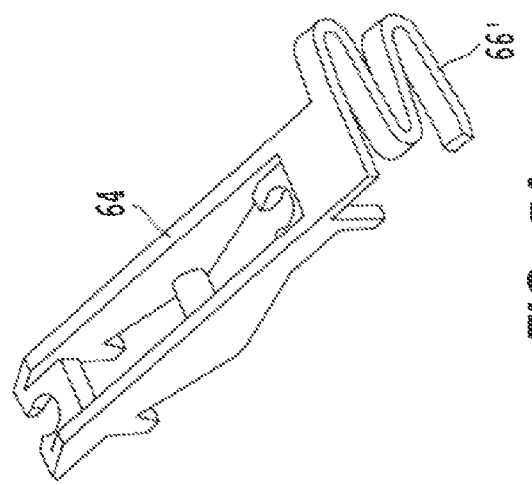
Figure 5C:
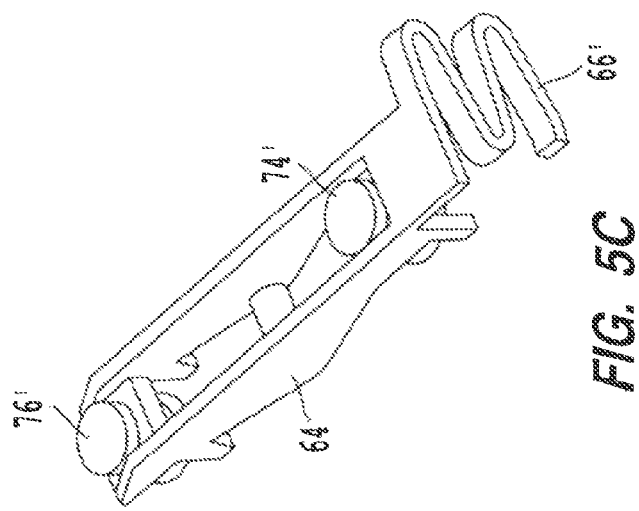

Finally, FIG. 5 illustrates, in greater detail (with 3 different three-dimensional views), the geometry of the rocker arm (64') with its S-shaped part (66'), its counterweight (76') that cooperates with the water-discharge orifice and the excrescence (74') that cooperates with the fuel drainage orifice. It can be seen therefrom that the counterweight (76') and the excrescence (74') are separate parts inserted into orifices intentionally moulded in the part in the form of a rocker arm (64').

The invention claimed is:

1. A system for filling a tank, comprising;
   a pipe head;
   a fill pipe extending between the pipe head and the tank; and
   an intermediate part made of a rigid thermoplastic, attached by welding between the pipe head and the fill pipe,
   wherein the pipe head includes a chamber with an inlet opening that connects to an atmosphere, an outlet opening that connects to the fill pipe, and a stopper that closes an access to the fill pipe, the stopper being movable between an open position, in which the access to the fill pipe is open, and a closed position, in which the access to the fill pipe is closed, the inlet and outlet openings of the pipe head accommodating introduction of a filling nozzle into the fill pipe through the pipe head when the stopper is in the open position,
   wherein the fill pipe or is preceded by a local restriction which substantially reduces a cross section of a passage for the filling nozzle to correspond to an outer diameter of the filling nozzle,
   wherein a degassing connection links the fill pipe and the pipe head outside of the outlet opening of the pipe head, the degassing connection providing degassing when filling the tank,
   wherein the local restriction is formed by a separate part attached to the fill pipe or pipe head, and
   wherein the intermediate part supports the separate part and includes a pipe extending at least partly inside the fill pipe and having a diameter smaller than a diameter of the fill pipe.

2. The system according to Claim 1, wherein the separate part is made of a flexible material, attached to or overmoulded on the intermediate part which supports the separate part, and wherein a cross section of the local restriction is smaller than the outer diameter of the filling nozzle.

3. The system according to Claim 1, wherein the pipe of said intermediate part comprises a funnel section where the local restriction is positioned.

4. The system according to claim 1, wherein the separate part is disposed between the stopper and the fill pipe, such that the separate part is free from contact with the stopper.

having a cross section larger than a cross section of the filling nozzle, and being divided into an upstream part directed towards the pipe head, the upstream part of the intermediate chamber connecting with the, pipe head via the outlet opening of the pipe head, and a downstream part directed towards the fill pipe; and being equipped with a lower orifice connecting the intermediate chamber with the fill pipe, and an upper orifice connecting the intermediate chamber with the pipe head outside of the outlet opening of the pipe head.

5. The system according to claim 1, wherein the stopper is a rotating valve body with an opening of cylindrical passage passing through the valve body and an outer wall sealing the outlet opening of the chamber of the pipe head when the stopper is in the closed position thereof.

6. The system according to claim 5, further comprising:
a sealing flap linked to the inlet opening of the pipe head, the sealing flap being movable between an open position and a closed position of the inlet opening; and
a coupling member linking the sealing flap to the stopper, so that the stopper is moved into the open position of the stopper when the sealing flap is moved into the open position of the sealing flap, and in that the stopper is moved into the closed position of the stopper when the sealing flap is moved into the closed position of the sealing flap.

7. The system according to Claim 1,
wherein the separate part is integral with the intermediate part, and
wherein a cross section of the local restriction is larger than the outer diameter of the filling nozzle.

8. The system according to claim 7, wherein the intermediate part delimits an intermediate chamber between the pipe head and the fill pipe, the intermediate chamber:
having a cross section larger than a cross section of the filling nozzle, and being divided into an upstream part directed towards the pipe head, the upstream part of the intermediate chamber connecting with the pipe head via the outlet opening of the pipe head, and a downstream part directed towards the fill pipe; and
being equipped with a lower orifice connecting the intermediate chamber with the fill pipe, and an upper orifice connecting the intermediate chamber with the pipe head outside of the outlet opening of the pipe head.

9. The system according to claim 8,
wherein the intermediate part includes a coupling to a vapour recirculation duct linked to the tank that emerges, below the intermediate chamber, via a recirculation orifice, and
wherein the lower orifice of the intermediate chamber is located on a first side of the local restriction and the recirculation orifice is located on a second side of the local restriction, the first side of the local restriction being opposite the second side of the local restriction with respect to an axis of the local restriction.

10. The system according to claim 8, wherein the lower and upper orifices of the intermediate chamber are diametrically opposed.

11. The system according to claim 8, further comprising:
a mobile component that is movable between a first position, in which an upper orifice of the intermediate chamber is sealed, and a second position, in which the upper orifice of the intermediate chamber is open; and
an activation means for moving the mobile component into the second position of the mobile component when the stopper is moved into the open position of the stopper.

12. The system according to claim 11, further comprising, prestressing means for keeping the mobile component in the first position of the mobile component, the mobile component and the stopper being formed and arranged so that a movement of the stopper into the open position of the stopper causes a movement of the mobile component into the second position of the mobile component.

13. The system according to claim 11, further comprising, a discharge opening in the chamber of the pipe head, the mobile component keeping the discharge opening open when the mobile component is in the first position of the mobile component and sealing the discharge opening when the mobile component is in the second position of the mobile component.

14. The system according to claim 11, wherein the mobile component of includes
a rocker arm that integrates a resilient part at a first end thereof,
a counterweight at a second end thereof, and
at least one excrescence having a shape, a size, and a location that are suitable so that said excrescence seals the upper orifice of the intermediate chamber in a given position of the rocker arm.

15. The system according to claim 11, wherein the mobile component comprises an oblong body with a first end and a second end, the first end including a means for engaging with the stopper and the second end sealing the upper orifice of the intermediate chamber when the mobile component is in the first position of the mobile component.

16. The system according to claim 15, wherein the engagement means of the mobile component comprises a nose that cooperates with a bearing of the stopper.

\* \* \* \* \*